(12) United States Patent
Bendapudi et al.

(10) Patent No.: US 7,739,553 B2
(45) Date of Patent: Jun. 15, 2010

(54) SYSTEM CRASH ANALYSIS USING PATH TRACING TECHNOLOGIES

(75) Inventors: Perraju Bendapudi, Hyderabad (IN); Suryanarayana Harsha, Bangalore (IN); Harish Mohanan, Hyderabad (IN); Rajesh Jalan, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 11/756,546

(22) Filed: May 31, 2007

(65) Prior Publication Data

US 2008/0301502 A1 Dec. 4, 2008

(51) Int. Cl.
*G06F 11/00* (2006.01)
(52) U.S. Cl. ...................................................... 714/45
(58) Field of Classification Search ............. 714/25–30, 714/32–39, 45–51
See application file for complete search history.

(56) References Cited

U.S. PATENT DOCUMENTS

| | | | |
|---|---|---|---|
| 6,202,199 B1 | 3/2001 | Wygodny et al. | |
| 6,353,924 B1 | 3/2002 | Ayers | |
| 6,681,385 B1* | 1/2004 | Steensgaard et al. | 717/133 |
| 6,996,806 B2* | 2/2006 | Bates et al. | 717/125 |
| 7,058,928 B2 | 6/2006 | Wygodny et al. | |
| 7,120,901 B2 | 10/2006 | Ferri et al. | |
| 7,207,032 B1* | 4/2007 | Verbitsky | 717/106 |
| 2002/0066080 A1 | 5/2002 | O'Dowd | |
| 2003/0061600 A1* | 3/2003 | Bates et al. | 717/133 |
| 2004/0025093 A1 | 2/2004 | Willy et al. | |
| 2005/0203952 A1 | 9/2005 | Deily et al. | |
| 2005/0273665 A1 | 12/2005 | Menadue | |
| 2006/0168481 A1 | 7/2006 | Nemoto | |
| 2006/0195745 A1 | 8/2006 | Keromytis et al. | |
| 2008/0022262 A1* | 1/2008 | Prakash et al. | 717/124 |
| 2008/0092129 A1* | 4/2008 | Prakash et al. | 717/162 |
| 2008/0222614 A1* | 9/2008 | Chilimbi et al. | 717/130 |

OTHER PUBLICATIONS

Chen, et al., "Path-Based Failure and Evolution Management", NSDI '04, Mar. 2004, Copyright 2004 Usenix Association. pp. 309-322 of the Proceedings.
Vaswani, et al., "Preferential Path Profiling: Compactly Numbering Interesting Paths", POPL'07 Jan. 17-19, 2007, Nice, France. Copyright 2007 ACM. pp. 351-362.
Pocza, et al., "Towards Effective Runtime Trace Generation Techniques in the .NET Framework", Journal of .NET Technologies vol. 4., No. 1-3, 2006 pp. 141-150.

* cited by examiner

*Primary Examiner*—Nadeem Iqbal

(57) ABSTRACT

Technologies, systems and methods for code path analysis of an executable including: generating call graphs and control flow graphs of selected functions in the executable, and instrumenting the selected functions to provide for logging of path trace information for the selected functions upon execution of the instrumented executable, the path trace information usable for efficient system crash analysis and debugging. A stack trace from a crash dump may be utilized in the selection of the functions to analyze.

19 Claims, 5 Drawing Sheets

SYSTEM CRASH ANALYSIS USING PATH TRACING TECHNOLOGIES

BACKGROUND

Given today's highly configurable and customizable computing environments, and highly complex software, system crashes can occur for nearly an infinite set of reasons. Crash dumps are often available that include a stack trace leading up to the failure. Such crash dumps may aid in determining the cause of a crash, but often do not include critical information regarding the reason for the failure. The lack of such critical information can significantly complicate the debugging process, making the identification and correction of failure-causing errors time consuming and expensive.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies, systems and methods for code path analysis of an executable including: generating call graphs and control flow graphs of selected functions in the executable, and instrumenting the selected functions to provide for logging of path trace information for the selected functions upon execution of the instrumented executable, the path trace information usable for efficient system crash analysis and debugging. A stack trace from a crash dump may be utilized in the selection of the functions to analyze.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

Figure 1:
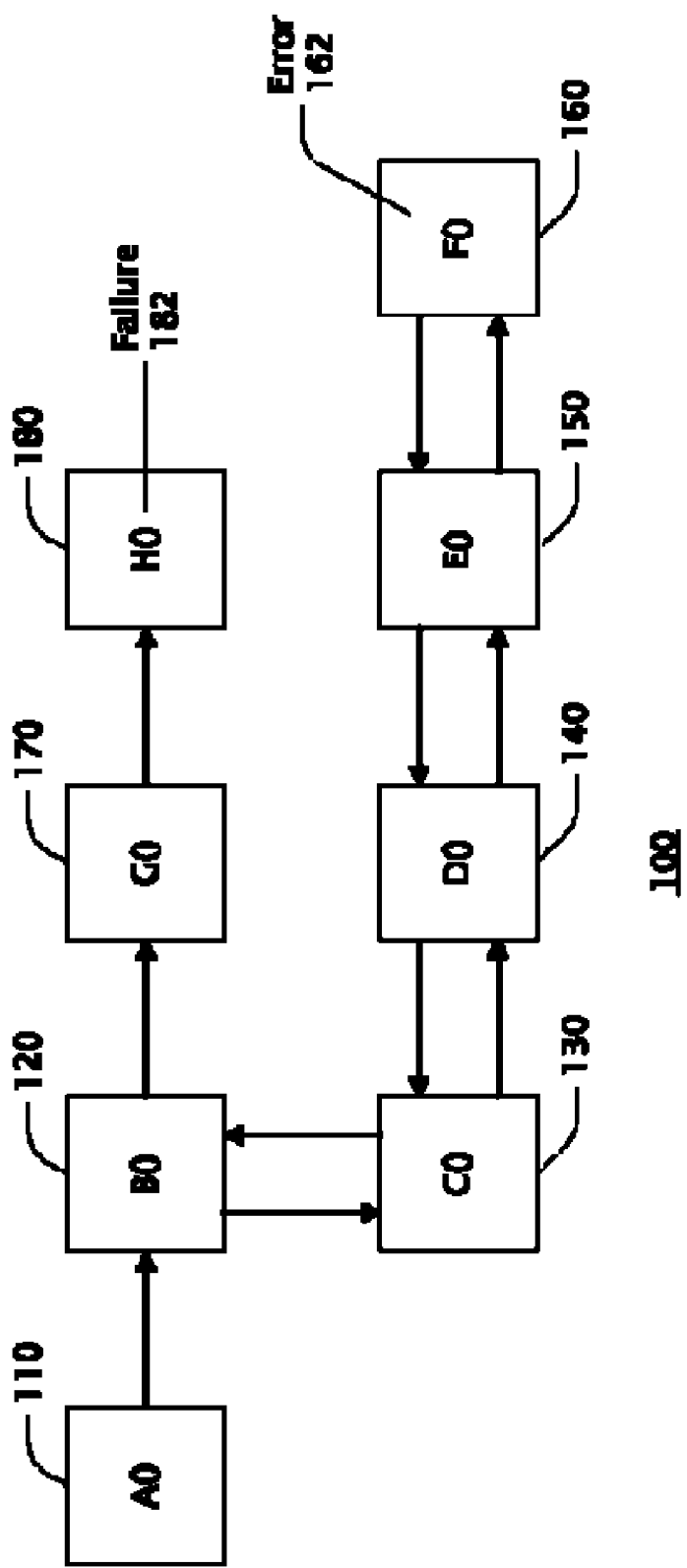
FIG. 1 is block diagram showing an example conventional call graph.

FIG. 1 is block diagram showing an example conventional call graph 100. A call graph, as used herein, is a directed graph that represents the calling relationship among functions or subroutines or the like in computer software or the like. Such a call graph provides an indication of the computer software's flow of execution and can be useful in tracking down software failures. Call graph 100 shows eight functions and an example set of calling relationships between them. Specifically, A( ) 110 calls B( ) 120 which calls C( ) 130 which calls D( ) 140 which calls E( ) 150 which calls F( ) 160. An example error 162 is shown occurring in F( ) 160, but this error does not result immediately in a failure. F( ) 160 then returns to E( ) 150 which returns to D( ) 140 which returns to C( ) 130 which returns to B( ) 120 which calls G( ) 170 which calls H( ) 180. An example failure or crash 182 is shown occurring in H( ) 180 stemming from error 162 that occurred in F( ) 160.

A typical stack trace from a crash dump resulting from failure 182 of call graph 100 might look like this: A( )→B( )→G( )→H( ). Note that this example stack trace does not suggest the actual call graph 100, the calling of functions C( ) D( ), E( ), and F( ), or error 162 in function F( ) that resulted in the failure 182 in function H( ). Lacking this information can make debugging very difficult.

Figure 2:
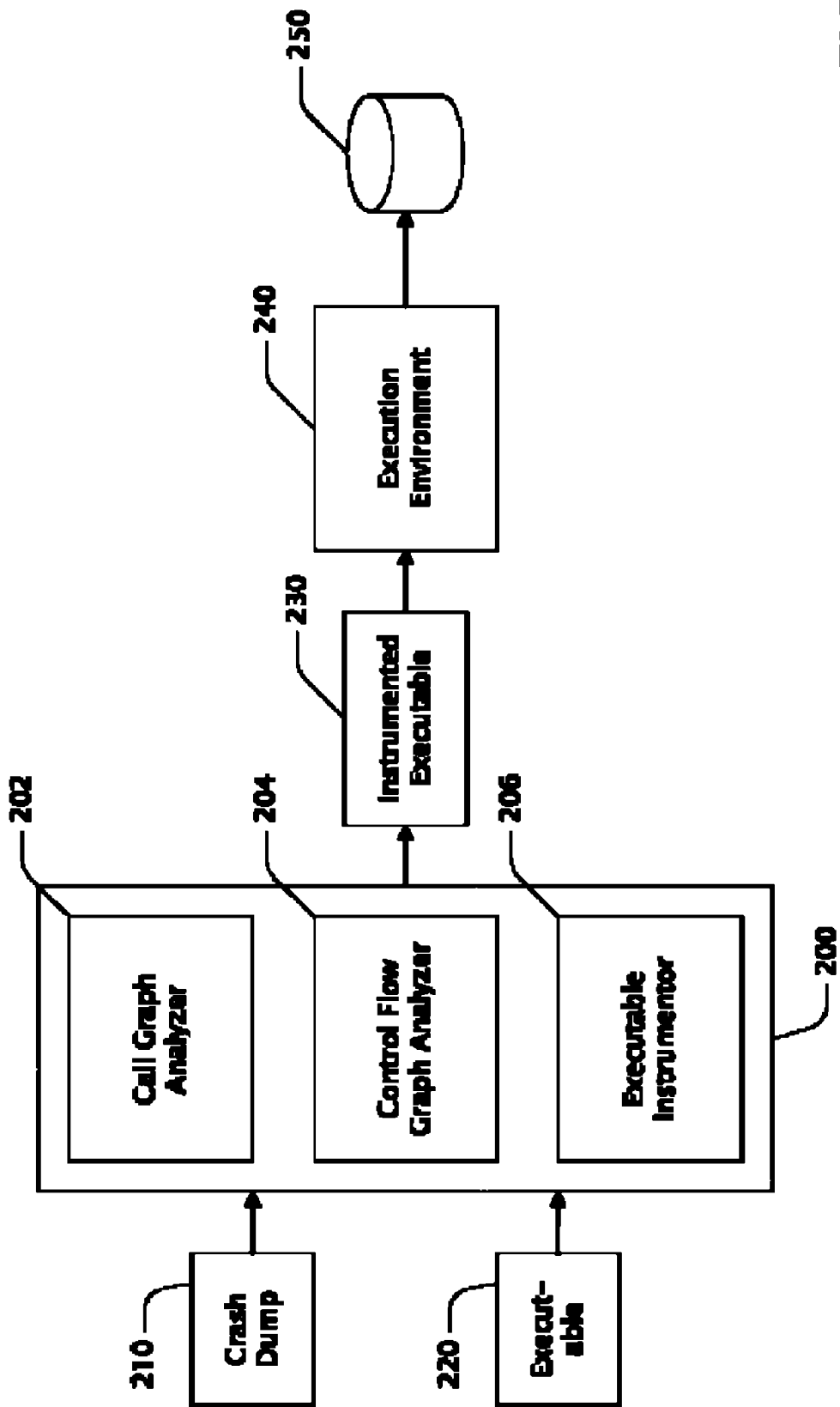
FIG. 2 is a block diagram showing an example path trace analysis and instrumentation ("PTAI") system along with the example crash dump, the corresponding example executable, an example instrumented executable, a suitable execution environment, and an example log.

FIG. 2 is a block diagram showing an example path trace analysis and instrumentation ("PTAI") system 200 along with the example crash dump 210, the corresponding example executable 220, an example instrumented executable 230, a suitable execution environment 240, and an example log 250. PTAI system 200 provides significantly more debugging information than is available via crash dump 210 alone, thus aiding a developer to reproduce and isolate the code path leading to the failure more efficiently.

Crash dump 210 is typically a conventional crash dump including a stack trace indicating the call stack at the time of the failure. Executable 220 is typically the executable code or software that failed corresponding to crash dump 210. For example, if a Minesweeper v6.0 software program failed resulting in a crash dump 210, then the Minesweeper v6.0 executable code 220 is the program that was running at the time of the failure, or the equivalent thereof, resulting in crash dump 210.

PTAI system 200 typically accepts crash dump 210 and a corresponding executable 220 as input which may be processed by call graph analyzer ("CGA") 202, control flow graph analyzer ("CFA") 204, and/or executable instrumentor ("EXI") 206. Processing typically results in instrumented executable 230 that, when executed, logs path trace information generally sufficient to trace the path of execution leading to the failure. Such path trace information typically includes and/or is based on both call graph information (such as described in connection with FIG. 1) and control flow graph information (such as described in connection with FIG. 3) and may aid a developer in debugging the failure far more efficiently than stack trace information alone.

Example call graph analyzer ("CGA") 202 typically analyzes executable 220 to generate a call graph, as described in connection with FIG. 1, representing some or all of the calling relationships among functions or the like of executable 220. In one example, the call graph generated may be limited to the portion of executable 220 defined by the stack trace of crash dump 210. Alternatively, the call graph generated may represent all of the calling relationships of executable 220, or any portion thereof. A selection of functions may be made by a developer via any user interface or the like sufficient to enable such a selection. Such a selection may be saved and/or loaded as part of a configuration, each such configuration being given a unique name or ID.

In one example, the functionality of CGA 202 may be provided by Vulcan technology ("Vulcan") described at least in part by U.S. Pat. No. 6,460,178 "Shared Library Optimization for Heterogeneous Programs"; U.S. Pat. No. 6,481,008 "Instrumentation and Optimization Tools for Heterogeneous Programs"; U.S. Pat. No. 6,609,248 "Cross Module Representation of Heterogeneous Programs"; U.S. Pat. No. 6,662,356 "Application Program Interface for Transforming Heterogeneous Programs"; and U.S. Pat. No. 6,802,056 "Translation and Transformation of Heterogeneous Programs"; all of which are assigned to the assignee of this application and each of which is incorporated herein by reference in its entirety for all they teach and suggest. In other examples, other technologies and/or methodologies may be used.

Figure 3:
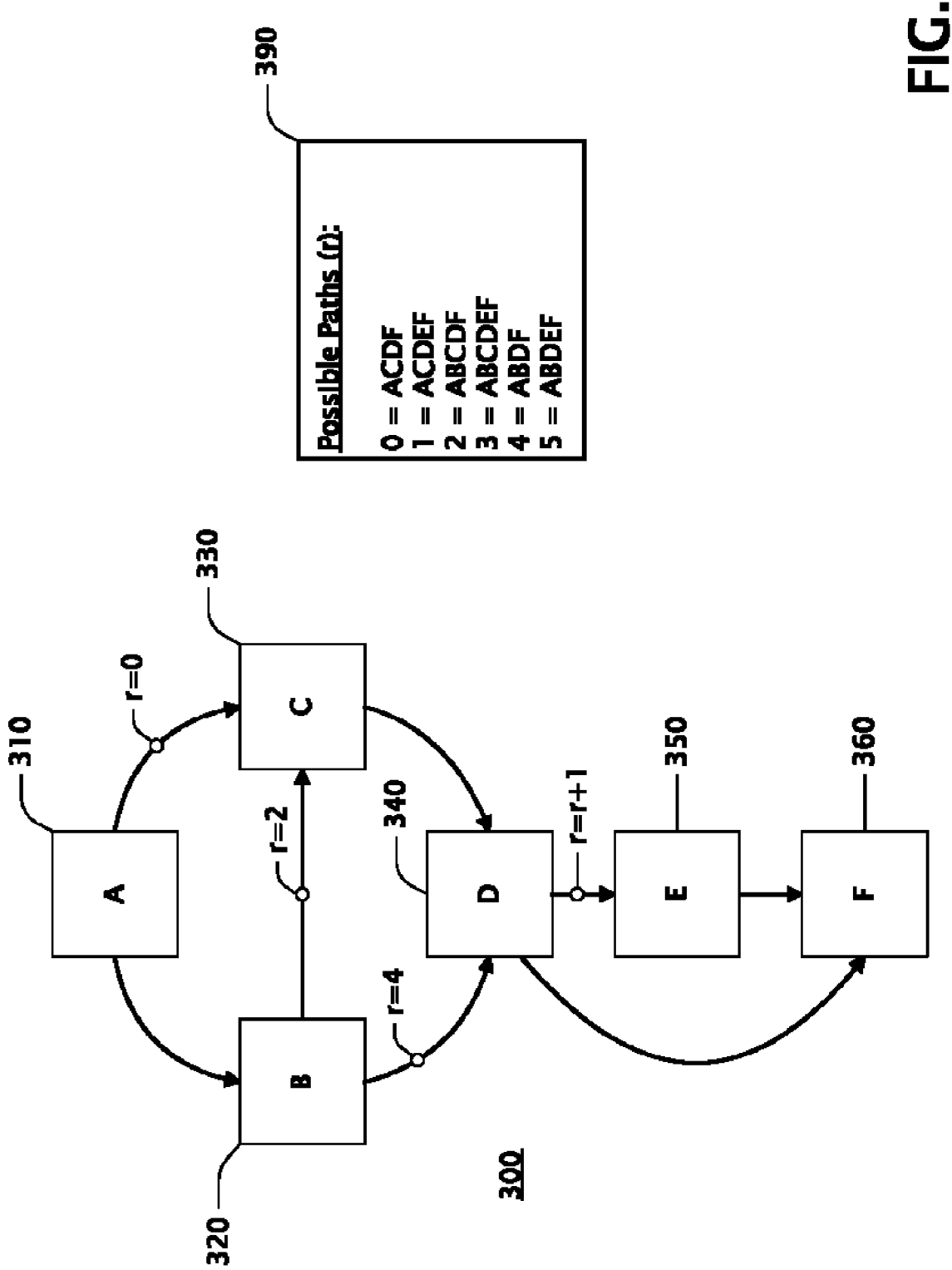
FIG. 3 is a block diagram showing an example control flow graph including a set of code blocks and the edges by which they are connected, and the various paths possible through the graph.

Example control flow graph analyzer ("CFA") 204 typically analyzes executable 220 to generate a control flow graph, as described in connection with FIG. 3, representing some or all of the control flow of executable 220. In one example, the control flow graph generated may be limited to the portion of executable 220 defined by the stack trace of crash dump 210. Alternatively, the control flow graph generated may represent all of the control flow information of executable 220, or any portion thereof. A selection may be made by a developer via any user interface or the like sufficient to enable such a selection. Such a selection may be saved and/or loaded as part of a configuration, each such configuration being given a unique name or ID.

In one example, control flow graphs are generated using technologies described in: Ball, T., Larus J. R., *Optimally Profiling and Tracing Programs*, University of Wisconsin—Madison, Computer Science Department, Technical Report #1031, Revision 1, Sep. 6, 1991; and Ball, T., Larus J. R., *Optimally Profiling and Tracing Programs*, ACM Transactions on Programming Languages and Systems, 16(3):1319-1360, July 1994; both references referred to herein as "Ball and Larus" and each of which is incorporated herein by reference in its entirety for all they teach and suggest. In other examples, other technologies and/or methodologies may be used.

Example executable instrumentor ("EXI") 206 typically instruments executable 220 such that instrumented executable 230 calls a runtime library to log information about the exact paths taken during execution, or path trace information. Application of instrumentation is typically restricted to those portions of the executable selected for generation of a call graph and control flow graph(s). Logged path trace information typically includes a path identifier ("ID") for each path taken during execution. Instrumentation typically includes provisions for logging thread IDs that indicate which thread (of a multithreaded program) a path ID corresponds to. Further logged information typically includes an indicator of whether a path ID belongs to a call graph (a transition between functions) or a control flow graph (a transition within a function between blocks). Instrumentation also typically includes provisions for logging abrupt path terminations due to exceptions or the like. Thus a typical path trace information log entry may include a thread ID, a path ID, a path type (call graph path or control flow graph path). A path ID may indicate a specific path between blocks of a function from the function entry point to the function exit point. Alternatively, a path ID may indicate a specific transition between one function and another function. Each path ID used in an instrumented executable tends to be unique from all others. In one example, EXI functionality is performed by Vulcan technologies. In other examples, other technologies and/or methodologies may be used.

In one example, only the functions associated with the stack trace of crash dump 210 and those that they may call, as determined by CGA 202 and CFA 204, are instrumented. This limits the instrumentation to those areas of executable 220 that are within the call graph and control flow graph of the stack trace from the crash. In this case, code unrelated to the crash is typically not instrumented, thus eliminating the need to instrument the entire executable 220. In alternative example, the entire executable 220 may be instrumented or any portion thereof selected by a developer. Such a selection may be made via any user interface or the like sufficient to enable such a selection. Such a selection may be saved and/or loaded as part of a configuration, each such configuration being given a unique name or ID. Further, by instrumenting paths, and not edges, instrumentation efficiency may be improved. Paths and edges are described in more detail in connection with FIG. 3.

Example instrumented executable 230 is typically an instrumented version of executable 220 generated by PTAI system 200 and based on a stack trace from crash dump 210 and/or developer selection. In one example, instrumented executable 230 is operable to log path trace information indicating each instrumented path taken during execution. In one example, instrumented executable 230 operates in conjunction with a runtime library to log path trace information.

Example execution environment 240 is typically any suitable computing environment, such as described in connection with FIG. 5, for executing instrumented executable 230 and providing for the logging of path trace information. Such an execution environment is typically coupled to a suitable data store 250 sufficient to store and provide access to logged path trace information.

FIG. 3 is a block diagram showing an example control flow graph 300 including a set of code blocks and the edges by which they are connected, and the various paths possible 390 through the graph. Such a control flow graph typically represents the entire control flow of a single function or the like and can be used to calculate all possible paths through the graph. Each unique path is typically given a unique path ID. During execution of an instrumented executable, such a path ID is typically logged each time the path associated with the path ID is taken.

Each arrow of control flow graph 300 indicates an edge, or a transition from one block to another. For example, block A (310) can transition either to block B (320) or to block C (330) as indicated by the arrows extending from block A (310). One method of tracking the flow through the control flow graph is to track the edges traversed. It can be seen that the fewest edges possible to traverse involve the path (A→B→D→F) or (A→C→D→F), each traversing three edges. Worst case, 5 edges are traversed for path (A→B→C→D→E→F). Clearly, logging information describing each edge traversed can be inefficient due to the potentially large number of edges comprising a single path. Alternatively, logging the path taken through graph 300 may be more efficient, requiring only a single log entry versus one entry per edge traversed. In the example shown in FIG. 3, there are six possible paths through the graph as shown in chart 390. Rather than log each edge traversed, the path ID of the path taken through the graph can be logged. Table 390 of FIG. 3 shows example IDs 0 through 5 and the example paths they represent.

One example of the generation of a path ID is described in Ball and Larus. For example, FIG. 3 shows a method for generating a path ID based representing the execution path taken through graph 300. Let r represent the path ID of the path taken. An analysis such as per Ball and Larus of graph 300 determines that by instrumenting the value of r at select edges of the graph, the path taken can be efficiently generated and indicated by path ID which is the value of r once a path is traversed. For example: setting r=0 upon traversal of edge (A→C); setting r=2 traversal of edge (B→C) setting r=4 traversal of edge (B→D); and setting r=r+1 traversal of edge (D→E) generates an appropriate path ID as shown in table 390. In other examples, other technologies and/or methodologies may be used.

Figure 4:
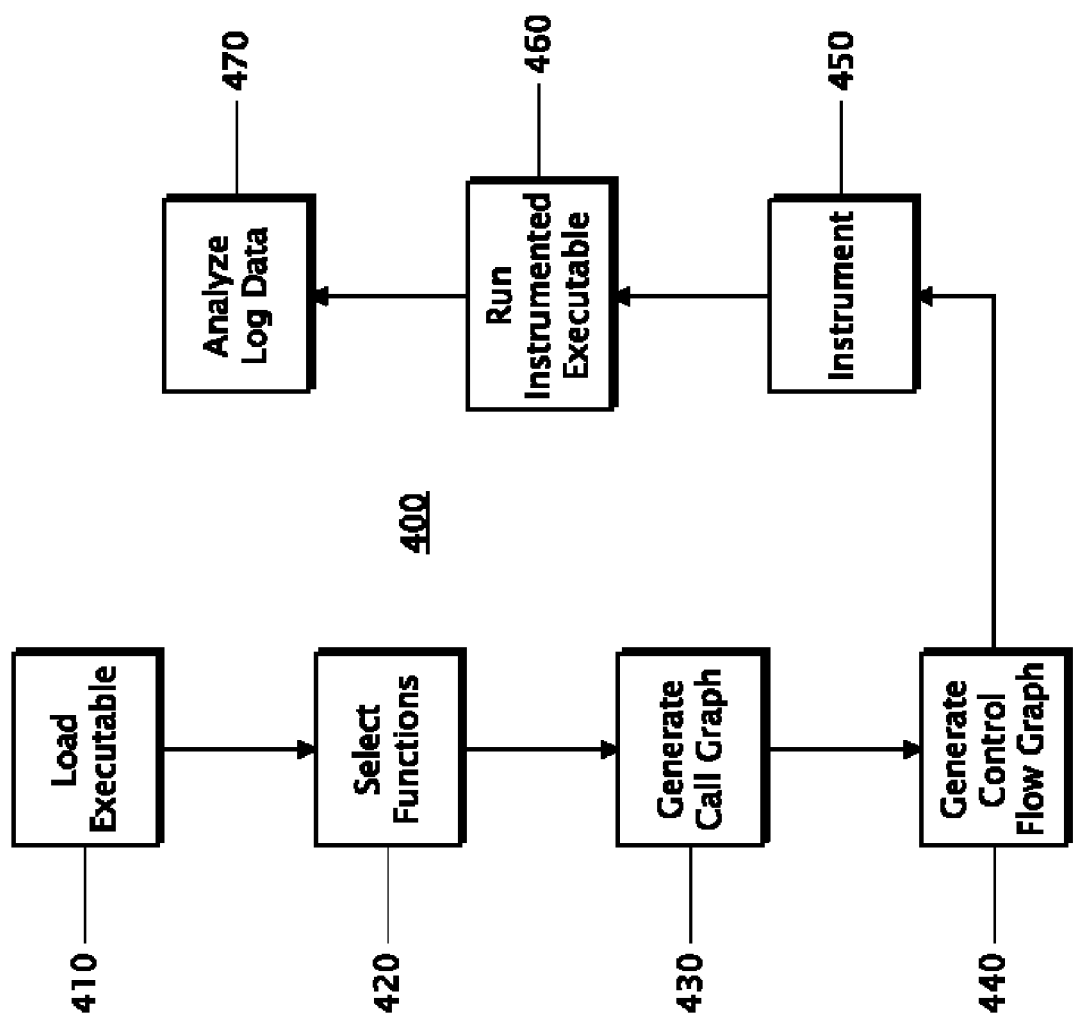
FIG. 4 is a block diagram showing an example method for system crash analysis using path tracing technologies.

FIG. 4 is a block diagram showing an example method 400 for system crash analysis using path tracing technologies. Method 400 presents the analysis and instrumenting of an executable, such as one involved in a system crash or the like, running the instrumented executable resulting is path trace log entries, and then analyzing the logged path trace information. While it is common to use method 400 to perform system crash analysis, method 400 can also be performed on any portion of any executable program or the like regardless of whether or not a system crash or failure or the like has occurred. The term "function" as used herein includes functions, methods, procedures, subroutines, interrupt routines, traps, handlers, and the like.

Block 410 indicated loading the executable to be analyzed into a PTAI system. Such an executable may comprise one or more files such as binary files, dynamic link libraries ("DLLs"), or the like. Such an executable may have crashed or failed while running or executing. Further, a crash dump corresponding to the failed executable may also be loaded into the PTAI system, such crash dump typically including a stack trace. Once the executable has been loaded into the PTAI system, method 400 typically continues at block 420.

Block 420 indicates selecting from among all the functions in the loaded executable: the functions to be instrumented and analyzed. Selection may be made by a developer using any user interface suitable for such selection. Exception handlers and the like may optionally be automatically selected, or selected by the developer. In one example, all functions may be selected. In another example, a start function and an end function may be selected, thus selecting all functions and code that may be in an execution path between the two. In yet another example, if a crash dump was loaded, the functions represented in a stack trace of the crash dump may be selected. Once the functions of interest have been selected, method 400 typically continues at block 430.

Block 430 indicates processing the selected functions of the loaded executable to generate a call graph such as described in connection with FIG. 1. The PTAI system typically processes the selected functions of the executable and generates the call graph. The call graph may be displayed in any suitable form such that a developer can select functions from the graph. Once the call graph is generated, method 400 typically continues at block 440.

Block 440 indicates generating one or more control flow graphs based on the functions selected. Such control flow graphs are typically generated as described in connection with FIG. 3. In one example, generation of a control flow graph includes analyzing the functions in the call graph so as to enable instrumentation of path IDs such as described in connection with FIG. 3. Once the control flow graphs(s) are generated, method 400 typically continues at block 450.

Block 450 indicates instrumenting the selected functions such that, when executed, the instrumented executable logs path trace information. Once the selected functions of the executable are instrumented, method 400 typically continues at block 460.

Block 460 indicates executing or running the instrumented executable. This is typically done in a sufficient computing environment, such as that described in connection with FIG. 5 or the like. In some cases, such as when analyzing a failed executable, the instrumented executable may be run on the system on which it failed, or on a similar system. During execution, the instrumented executable logs path trace information based on the functions that were selected for instrumentation at block 430. Once the instrumented executable has been run, method 400 typically continues at block 470.

Block 470 indicates analyzing the logged path trace data. Typically this involves a developer studying the logged information in order to find indications of errors leading to a failure, such as that resulting in a crash dump. Such information tends to focus the developer on the specific code paths taken resulting in the error, this resulting in a more efficient system crash analysis process.

Figure 5:
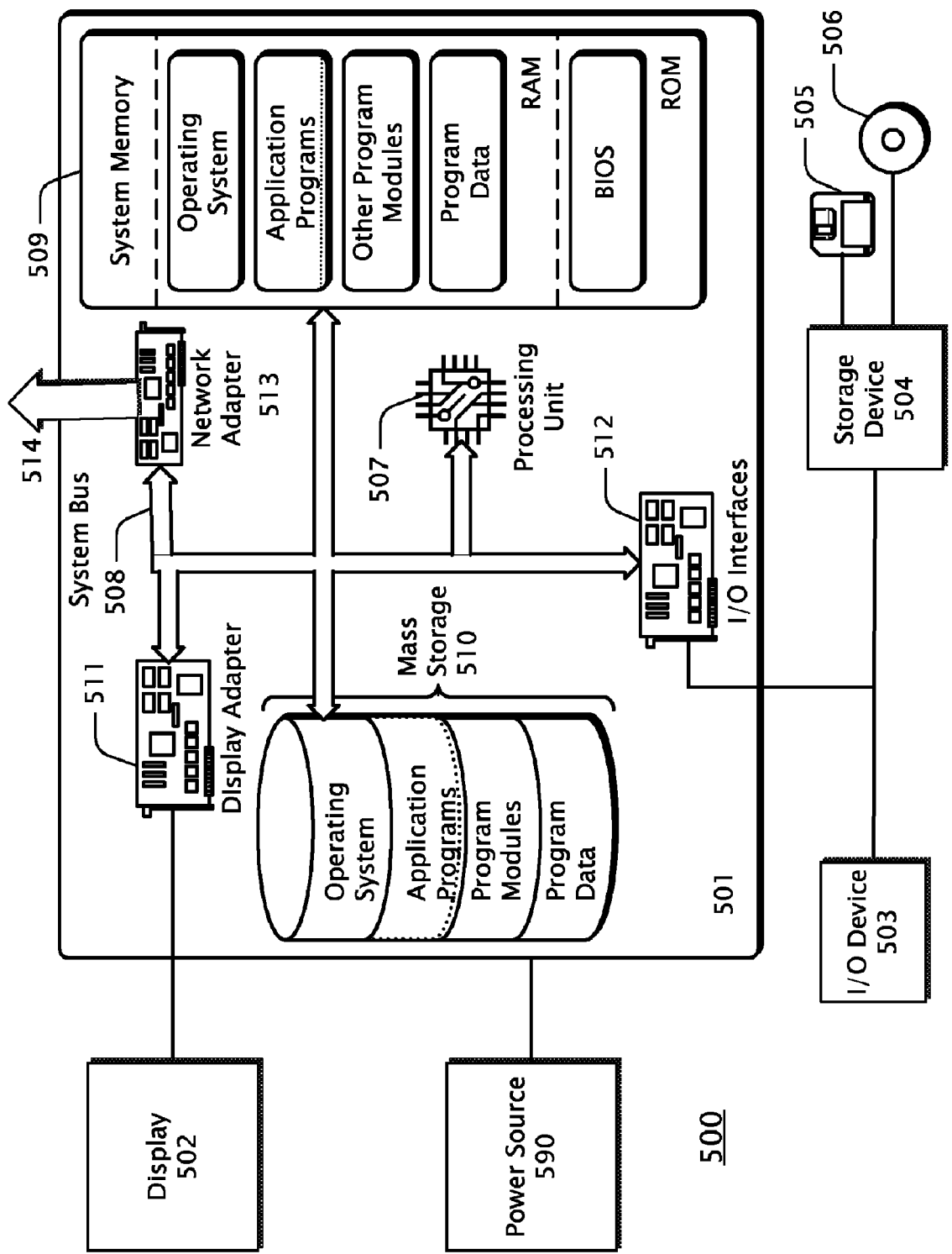
FIG. 5 is a block diagram showing an example computing environment in which the technologies described herein may be implemented.

FIG. 5 is a block diagram showing an example computing environment 500 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 500 typically includes a general-purpose computing system in the form of a computing device 501 coupled to various components, such as peripheral devices 502, 503, 504 and the like. System 500 may couple to various other components, such as input devices 503, including voice recognition, touch pads, buttons, keyboards and/or pointing devices, such as a mouse or trackball, via one or more input/output ("I/O") interfaces 512. The components of computing device 501 may include one or more processors (including central processing units ("CPU"), graphics processing units ("GPU"), microprocessors ("μP"), and the like) 507, system memory 509, and a system bus 508 that typically couples the various components. Processor 507 typically processes or executes various computer-executable instructions to control the operation of computing device 501 and to communicate with other electronic and/or computing devices, systems or environment (not shown) via various communications connections such as a network connection 514 or the like. System bus 508 represents any number of several types of bus structures, including a memory bus or memory controller, a peripheral bus, a serial bus, an accelerated graphics port, a processor or local bus using any of a variety of bus architectures, and the like.

System memory 509 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 509 typically stores data, computer-executable instructions and/or program modules comprising computer-executable instructions that are immediately accessible to and/or presently operated on by one or more of the processors 507.

Mass storage devices 504 and 510 may be coupled to computing device 501 or incorporated into computing device 501 via coupling to the system bus. Such mass storage devices 504 and 510 may include non-volatile RAM, a magnetic disk drive which reads from and/or writes to a removable, non-volatile magnetic disk (e.g., a "floppy disk") 505, and/or an optical disk drive that reads from and/or writes to a non-volatile optical disk such as a CD ROM, DVD ROM 506. Alternatively, a mass storage device, such as hard disk 510, may include non-removable storage medium. Other mass storage devices may include memory cards, memory sticks, tape storage devices, and the like.

Any number of computer programs, files, data structures, and the like may be stored in mass storage 510, other storage devices 504, 505, 506 and system memory 509 (typically limited by available space) including, by way of example and not limitation, operating systems, application programs, data files, directory structures, computer-executable instructions, and the like.

Output components or devices, such as display device 502, may be coupled to computing device 501, typically via an interface such as a display adapter 511. Output device 502 may be a liquid crystal display ("LCD"). Other example output devices may include printers, audio outputs, voice outputs, cathode ray tube ("CRT") displays, tactile devices or other sensory output mechanisms, or the like. Output devices may enable computing device 501 to interact with human operators or other machines, systems, computing environments, or the like. A user may interface with computing environment 500 via any number of different I/O devices 503 such as a touch pad, buttons, keyboard, mouse, joystick, game pad, data port, and the like. These and other I/O devices may be coupled to processor 507 via I/O interfaces 512 which may be coupled to system bus 508, and/or may be coupled by other interfaces and bus structures, such as a parallel port, game port, universal serial bus ("USB"), fire wire, infrared ("IR") port, and the like.

Computing device 501 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 501 may be coupled to a network via network adapter 513 or the like, or, alternatively, via a modem, digital subscriber line ("DSL") link, integrated services digital network ("ISDN") link, Internet link, wireless link, or the like.

Communications connection 514, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 590, such as a battery or a power supply, typically provides power for portions or all of computing environment 500. In the case of the computing environment 500 being a mobile device or portable device or the like, power source 590 may be a battery. Alternatively, in the case computing environment 500 is a desktop computer or server or the like, power source 590 may be a power supply designed to connect to an alternating current ("AC") source, such as via a wall outlet.

Some mobile devices may not include many of the components described in connection with FIG. 5. For example, an electronic badge may be comprised of a coil of wire along with a simple processing unit 507 or the like, the coil configured to act as power source 590 when in proximity to a card reader device or the like. Such a coil may also be configure to act as an antenna coupled to the processing unit 507 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 502, I/O device 503, or many of the other components described in connection with FIG. 5. Other mobile devices that may not include many of the components described in connection with FIG. 5, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A path trace analysis and instrumentation system comprising:
a call graph analyzer operable to generate a call graph corresponding to selected functions of an executable;
a control flow graph analyzer operable to generate a control flow graph corresponding to the selected functions represented in the call graph; and
an instrumentor operable to generate an instrumented executable from the executable based on the call graph and control flow graph, wherein the instrumented executable is operable to log a thread identifier, a corresponding path identifier, and a corresponding path type.

2. The system of claim 1 wherein the selected functions correspond to a stack trace from a crash dump.

3. The system of claim 1 wherein the selected functions are determined by selecting a start function and an end function.

4. The system of claim 1 wherein the control flow graph analyzer assigns a unique path identifier to each path through a function.

5. The system of claim 1 wherein the call graph analyzer assigns a unique path identifier to each edge between one function and another function.

6. The system of claim 1 wherein the instrumentor instruments the executable to calculate and log a path identifier representing a path traversed during execution.

7. A method for analyzing and instrumenting an executable, the method comprising:
loading the executable;
selecting functions in the executable;
generating a call graph from the selected functions;
generating a control flow graph for the selected functions;
assigning a unique path identifier to each path through the selected functions; and
instrumenting the executable based on the call graph and the control flow graph.

8. The method of claim 7 further comprising:
executing the instrumented executable; and
analyzing path trace information logged by the executed instrumented executable.

9. The method of claim 7 further comprising loading a crash dump including a stack trace.

10. The method of claim 9 wherein the selected functions correspond to the stack trace from the crash dump.

11. The method of claim 9 wherein the selected functions are determined by selecting a start function and an end function.

12. The method of claim 7 wherein the instrumenting the executable includes generating an instrumented executable operable to log a thread identifier, a corresponding path identifier, and a corresponding path type.

13. The method of claim 7 further comprising assigning a unique path identifier to each edge between one function and another function.

14. The method of claim 7 wherein the instrumenting the executable generates an instrumented executable operable to calculate and log a path identifier representing a path traversed during execution.

15. A computer-readable medium with computer-executable instructions stored thereon, the computer-executable instructions sufficient to cause a computing environment to perform a method for analyzing and instrumenting an executable, the method comprising:
loading the executable;
selecting functions in the executable;
generating a call graph from the selected functions;
generating a control flow graph for the selected functions; and
instrumenting the executable based on the call graph and the control flow graph, wherein the instrumenting the executable generates an instrumented executable operable to calculate and log a path identifier representing a path traversed during execution.

16. The computer-readable medium of claim 15, the method further comprising:
executing the instrumented executable; and
analyzing path trace information logged by the executed instrumented executable.

17. The system of claim 1 wherein the instrumented executable is operable in conjunction with a runtime library to log path trace information.

18. The method of claim 7 further comprising:
selecting the functions in the executable via a user interface;
saving the selected functions as part of a configuration; and
assigning a unique ID to the saved configuration.

19. The computer-readable medium of claim 15, the method further comprising:
performing the instrumenting on a selection of any portion of the executable;
saving the selection as a part of a configuration; and
providing a unique identifier for the saved configuration.

* * * * *